United States Patent [19]

Antos et al.

[11] Patent Number: 5,361,319
[45] Date of Patent: Nov. 1, 1994

[54] DISPERSION COMPENSATING DEVICES AND SYSTEMS

[75] Inventors: A. Joseph Antos, Elmira; Michael G. Blankenship; Douglas W. Hall, both of Corning; Edward F. Murphy; David K. Smith, both of Painted Post, all of N.Y.

[73] Assignee: Corning Incorporated, Corning, N.Y.

[21] Appl. No.: 830,692

[22] Filed: Feb. 4, 1992

[51] Int. Cl.$^5$ .......................... G02B 6/22; G02B 6/36
[52] U.S. Cl. ................................................. 385/123
[58] Field of Search ............................... 385/123-126

[56] References Cited

U.S. PATENT DOCUMENTS

| | | | |
|---|---|---|---|
| 4,261,639 | 4/1981 | Kogelnik et al. | 350/96.15 |
| 4,372,647 | 2/1983 | Okamoto et al. | 350/96.33 |
| 4,435,040 | 3/1984 | Cohen et al. | 350/96.33 |
| 4,439,007 | 3/1984 | Lazay et al. | 350/96.30 |
| 4,525,027 | 6/1985 | Okamoto et al. | 350/96.30 |
| 4,691,991 | 9/1987 | Unger | 350/96.33 |
| 4,715,679 | 12/1987 | Bhagavatula | 350/96.33 |
| 4,750,802 | 6/1988 | Bhagavatula | 350/96.15 |
| 4,755,022 | 7/1988 | Ohashi et al. | 350/96.33 |
| 4,768,853 | 9/1988 | Bhagavatula | 350/96.15 |
| 4,852,968 | 8/1989 | Reed | 350/96.33 |
| 4,889,404 | 12/1989 | Bhagavatula et al. | 385/123 X |
| 4,913,520 | 4/1990 | Kafka | 350/96.30 |
| 4,969,710 | 11/1990 | Tick et al. | 385/123 |
| 4,979,234 | 12/1990 | Agrawal et al. | 455/608 |

FOREIGN PATENT DOCUMENTS

| | | |
|---|---|---|
| 0089655 | 9/1983 | European Pat. Off. . |
| 0283748 | 9/1988 | European Pat. Off. . |
| 464812 | 1/1992 | European Pat. Off. . |
| 3-211530 | 9/1991 | Japan . |
| 0211530 | 9/1991 | Japan . |
| 62-275204 | 10/1991 | Japan . |
| 0275204 | 10/1991 | Japan . |
| 2116744B | 1/1987 | United Kingdom . |

OTHER PUBLICATIONS

Elektronik, vol. 39, No. 19. 14 Sep. 1990, Munchen DE, pp. 86–92 Scheider 'Einmoden-Lichtwellenleiter' p. 87, right column, line 15–line 22; FIG. 1; table 1.
Armitage, "Three-Level Fiber Laser Amplifier: A Theoretical Model", Applied Optics, Dec. 1, 1988, vol. 27, No. 23, pp. 4831–4836.
Tanaka et al., "Attenuation Free, Dispersion Shifted Fiber Doped With Distributed Erbium", Optical Soc. of America, vol. 13, pp. 138–141.
Agrawal, "NonLinear Fiber Optics", Academic Press, Inc., San Diego, Calif., 1989, p. 11.
Cohen et al., "Tailoring Zero Chromatic Dispersion into the 1.5–1.6 $\mu$m Low -Loss Spectral Region of Single-Mode Fibres", Electronic Letters, Jun. 7, 1979, vol. 15, No. 12, pp. 334–335.
Saifi et al., "Triangular-Profile Single-Mode Fiber", Optics Letters, Jan. 1982, vol. 7, No. 1, pp. 43–45.

(List continued on next page.)

Primary Examiner—Akm E. Ullah
Attorney, Agent, or Firm—K. McNeill Taylor, Jr.

[57] ABSTRACT

Disclosed is a family of dispersion compensating optical fibers that are adapted for use with conventional single-mode transmission fibers that are optimized for zero dispersion operation at a wavelength in the range from 1290 nm to 1330 nm to form a transmission link suitable for low dispersion operation in the 1520–1565 nm wavelength window. The dispersion compensating fibers are capable of providing a dispersion more negative than $-20$ ps/nm-km and attenuation less than 1 dB/km at wavelengths in the 1520–1565 nm region. Certain of the dispersion compensating fibers also exhibit a dispersion versus wavelength relationship having a negative slope in the 1520–1565 nm region, to compensate for the dispersion versus wavelength slope of the transmission fiber. The dispersion compensating fiber can be advantageously combined with a fiber amplifier to form a compensator that is adapted to overcome attenuation introduced into the system by the dispersion compensating fiber. In one embodiment, the dispersion compensating fiber is also a distributed fiber amplifier.

24 Claims, 6 Drawing Sheets

OTHER PUBLICATIONS

Bhagavatula, "Dispersion-Shifted and Dispersion-Flattened Single-Mode Designs", Technical Digest, Conference on Optical Fiber Communication, paper WF1, Feb. 26, 1986.

Tanaka et al., "Low-Loss Dispersion Shifted Fiber with Dual Shape Refractive Index Profile", National Conference Record 1987, Semiconductor Devices and Materials, I.E.I.C.E. (1987), pp. 2-217.

Okamoto et al., "Dispersion Minimisation in Single-Mode Fibres Over a Wide Spectral Range", Electronics Letters, vol. 15, No. 22, Oct. 25, 1979, pp. 729-731.

Cohen et al., "Low-Loss Quadruple-Clad Single-Mode Lightguides with Dispersion Below 2 ps/km nm Over the 1.28 $\mu$m-1.65 $\mu$m Wavelength Range", Electronics Letters, Nov. 25, 1982, vol. 18, No. 24, pp. 1023-1024.

Cohen et al., "Ultrabroadband Single-Mode Fibers", Technical Digest, Conference on Optical Fiber Communication, paper MF4, Feb. 28, 1983.

Cohen et al., "A Systematic Approach to Fabricating Single-Mode Lightguides", Proc. SPIE, vol. 425 (1983), pp. 28-32.

Cohen et al., "Measurements of the Axial Uniformity of Dispersion Spectra in Single-Mode Fibers", Proc. SPIE, vol. 425 (1983), pp. 56-62.

Francois, "Propagation Mechanisms in quadruple-Clad Fibres: Mode Coupling, Dispersion and Pure Bend Losses", Electronics Letters, vol. 19, No. 21, Oct. 13, 1983, pp. 885-886.

Bhagavatula et al., "Segmented-Core Single-Mode Fibres with Low Loss and Low Dispersion", Electronics Letters, vol. 19, No. 9, Apr. 25, 1983, pp. 317-318.

Cohen et al., "Tailoring the Shapes of Dispersion Spectra to Control Bandwidths in Single-Mode Fibers", Optics Letters, vol. 7, No. 4, Apr. 1982, pp. 183-185.

Lin et al., "Optical-Pulse Equalization of Low-Dispersion Transmission in Single-Mode Fibers in the 1.3-1.7 $\mu$m Spectral Region", Optics Letters, vol. 5, No. 11, Nov. 1980, pp. 476-478.

Larner & Bhagavatula, "Dispersion Reduction in Single-Mode-Fibre Links", Electronics Letters, vol. 21, No. 24, Nov. 21, 1985, pp. 1171-1172.

Vodhanel et al., "Performance of Directly Modulated DFB Lasers in 10-Gb/s ASK, FSK, and DPSK Lightwave Systems", Journal of Lightwave Technology, vol. 8, No. 9, Sep. 1990, pp. 1379-1385.

Gnauck et al., "Optical Equalization of Fiber Chromatic Dispersion in a 5-Gb/s Transmission System", IEEE Photonics Technology Letter, vol. 2, No. 8, Aug. 1990, pp. 585-587.

Gysel, "CATV AM Optical Transmission Links Using the 1550 nm Window", Proc. Manual, Fiber Optics 1991, Society of Cable Television Engineers, Jan. 1991, pp. 161-166.

DISPERSION COMPENSATING DEVICES AND SYSTEMS

FIELD OF THE INVENTION

This Invention relates to a system, and devices used in the system, for low-dispersion, low-attenuation single-mode transmission over a transmission link whose zero dispersion wavelength is substantially different from the transmission wavelength.

BACKGROUND OF THE INVENTION

A significant factor limiting the length of optical fiber transmission links is attenuation. In silica-based optical fiber design and manufacture, the attenuation performance of optical fibers has improved from about 20 dB/km in 1970 to near the theoretical minimum today: about 0.35 dB/km at 1310 nm and about 0.2 dB/km at 1550 nm.

In addition, optical fiber amplifiers using rare-earth dopants are well known, and recently various commercial systems have become available. See, e.g., Armitage, "Three-level fiber laser amplifier: a theoretical model", APPLIED OPTICS, Vol. 27, No. 23, Dec. 1, 1988, and the references cited therein. These fiber amplifiers can substantially reduce the link-length limitations due to fiber attenuation. To date, the only practical fiber amplifiers operate around 1520–1565 nm, where there is a transition in the $Er^{3+}$ dopant ion.

Another important link-length limitation is the total chromatic dispersion which occurs due to the material dispersion and waveguide dispersion in the optical fiber which forms the transmission link. Dispersion causes pulse spreading for pulses that include a range of wavelengths, as the speed of light in a glass fiber waveguide is a function of the wavelength of the light. Pulse broadening is a function of fiber dispersion, fiber length and the spectral width of the light source. Even systems with very narrow source wavelength range are affected by chromatic dispersion because the wavelength range of all sources is spread to some extent, for example, due to laser source chirp.

In standard step index single-mode fibers, the graph of total chromatic dispersion versus wavelength is largely a function of material dispersion and can be drawn as a roughly linear curve with positive slope. The curve has a zero crossing at approximately 1310 nm, and reaches a value of approximately 15 ps/nm-km at 1550 nm. Agrawal, *Nonlinear Fiber Optics*, Academic Press, Inc., San Diego, Calif., 1989, p. 11. For such conventional fibers, the bandwidth is highest around 1310 nm where dispersion is approximately zero. These conventional fibers are said to be optimized for operation around 1310 nm (hereinafter "optimized for operation at 1310 nm).

On the other hand, the minimum theoretical attenuation for conventional single-mode fibers made of $GeO_2$—$SiO_2$ glass is in the region of 1550 nm, and is due to Rayleigh scattering and infrared absorption. When transmission is carried out at 1310 nm, standard step-index fibers have attenuation approximately 1.75 times the theoretical minimum at 1550 nm. For transmission at 1550 nm, where standard step-index fibers generate substantial dispersion, link length is dispersion limited, as dispersion effects outweigh attenuation benefits.

As the total performance of the fiber is a function of both dispersion and attenuation, various attempts have been made to minimize the dispersion at 1550 nm in order to take advantage of the minimum attenuation in this wavelength range. Numerous "dispersion shifted" fiber designs have been developed which shift the zero crossing of the dispersion vs. wavelength curve to the 1550 nm region. See, e.g.: Cohen, Lin and French, ELECTRONICS LETTERS, Vol. 15, No. 12, Jun. 7, 1979, pp. 334–335; Bhagavatula U.S. Pat. No. 4,715,679; Saifi et al., "Triangular-profile single-mode fiber", OPTICS LETTERS, Vol. 7, No. 1, Jan. 1982, pp. 43–45; Ohashi et al. U.S. Pat. No. 4,755,022; Bhagavatula, "Dispersion-shifted and dispersion-flattened single-mode designs", Technical Digest, Conference on Optical Fiber Communication, paper WF1, Feb. 26, 1986; and, Tanaka et al., "Low-Loss Dispersion Shifted Fiber with Dual Shape Refractive Index Profile", National Conference Record 1987, Semiconductor Devices and Materials, I.E.I.C.E. (1987), p. 2–217. These dispersion shifted fibers are based on special refractive index profiles which generate negative waveguide dispersion to shift the total dispersion vs. wavelength curve to the right (to longer wavelengths).

In addition, numerous "dispersion flattened" fibers have been designed which have zero dispersion crossings in both the 1300 nm and 1550 nm transmission regions. See, e.g.: the Bhagavatula patent and paper cited above; Okamoto et al., "Dispersion Minimization in single-mode fibres over a wide spectral range", ELECTRONICS LETTERS, Vol. 15, No. 22, Oct. 25, 1979, pp. 729–731; Okamoto et al. U.S. Pat. No. 4,525,027; Cohen et al. U.K. patent 2 116 744; Cohen et al., "Low-loss Quadruple-clad single-mode lightguides with dispersion below 2 ps/km-nm over the 1.28 $\mu$m–1.65$\mu$m wavelength range", ELECTRONICS LETTERS, Vol. 18, No. 24, Nov. 25, 1982, pp. 1023–1024; Cohen et al., "Ultrabroadband single-mode fibers", Technical Digest, Conference on Optical Fiber Communication, paper MF4, Feb. 28, 1983; Cohen et al., "A systematic approach to fabricating single-mode lightguides", Proc SPIE, Vol. 425 (1983), pp. 28–32; Sears et al., "Measurements of the axial uniformity of dispersion spectra in single-mode fibers", Proc SPIE, Vol. 425 (1983), pp. 56–62; Unger U.S. Pat. No. 4,691,991; Francois, "Propagation Mechanisms in Quadruple-clad fibres: mode coupling, dispersion and pure bend losses", ELECTRONICS LETTERS, Vol. 19, No. 21, Oct. 13, 1983, pp. 885–886; and, Shigematsu et al. EPO published patent application 0 283 748.

Some references indicate that dispersion flattened fibers also have the benefit of a reduced slope around the zero crossing, enabling low dispersion transmission over a relatively wide range of wavelengths near the transmission wavelength. See, e.g.: Okamoto et al. U.S. Pat. No. 4,372,647; and, Lazay et al. U.S. Pat. 4,439,007.

Some dispersion flattened fiber designs generate slightly negative total dispersion at wavelengths in the range from 1300 nm to 1550 nm. Bhagavatula et al., "Segmented-core Single-mode Fibres with Low Loss and Low Dispersion", ELECTRONICS LETTERS, Vol. 19, No 9, Apr. 25, 1983, pp. 317–318, depicts in FIG. 3, a dispersion flattened fiber design, C, which has a total dispersion versus wavelength curve varying from about $-5$ ps/km-nm at 1300 nm to about $-2$ ps/km-nm at 1550 nm. This dispersion flattened design would not be practicable for dispersion compensation at 1550 nm, as the length of dispersion compensating fiber required would be 7–8 times the length of the transmission fiber. A similar dispersion versus wavelength curve is mentioned in Reed U.S. Pat. No. 4,852,968, at col. 9, lines 25–30.

Cohen et al., "Tailoring the shapes of dispersion spectra to control bandwidths in single-mode fibers", OPTICS LETTERS, Vol. 7, No. 4, Apr. 1982, pp. 183–185, is directed to dispersion flattening in computer-simulated "double-clad" fibers. FIG. 6, on page 185, includes one simulated fiber design, Case 3, which the authors claim "indicates that the short-wavelength zero crossing can conceivably be moved to a wavelength shorter than the material-dispersion zero crossing" (par. 1). In addition to shifting the zero crossing to the left, this simulated design indicates a very steeply negative slope in the 1450 nm wavelength region, and a total chromatic dispersion in this region of less than −40 ps/km-nm. Cohen et al. U.S. Pat. No. 4,435,040 contains a parallel disclosure, at col. 6, lines 45–54, with respect to FIG. 6.

It is not clear what, if anything, this reference indicates with respect to the 1550 nm region. If the dispersion curve is simply extended with a ruler, the value at 1550 nm would go off the measurement scale of FIG. 6 by a factor of several times the entire scale. There is no disclosure or suggestion with respect to the 1550 nm region in the reference, as the Case 3 simulation is directed to creating a zero crossing at a wavelength less than 1310.

What is clear from the Cohen et al. "Tailoring . . ." reference is that the absolute value of the slope of the total dispersion curve (about 2 ps/nm$^2$-km) is much greater than the slope of the total dispersion curve for standard singlemode fiber optimized for transmission at 1310 nm (which is about 0.06 ps/nm$^2$-km). It is thought that a fiber of this design will not transmit light at 1550 nm. Such a fiber would have very large attenuation, much greater than 1dB/km. This simulated fiber would not be practicable as a dispersion compensating fiber in the 1550 nm window (approximately 1520 nm–1565 nm) for a number of reasons. First, this fiber would not transmit light in the 1550 nm region, as the bend-edge wavelength for an actual fiber which might display such a highly negatively sloped dispersion vs. wavelength curve would be significantly below 1520 nm. The bend-edge wavelength is the wavelength at which a straight fiber will no longer propagate the fundamental mode.

Second, even a slight variation in transmission wavelength would result in an enormous change in dispersion compensating effect and therefore in the length of dispersion compensating fiber required for canceling out the positive dispersion in a conventional 1310 nm transmission link. In addition, the authors acknowledge the difficulty of manufacturing these "conceivable" simulated fibers: "As one might expect, the potentially attractive properties of double-clad light guides require tight tolerances on diameter and index difference" (p. 185, col. 1, par. 1).

Techniques have been proposed for transmission links with dispersion compensation means to cancel out the total chromatic dispersion over the link. Kogelnick et al. U.S. Pat. No. 4,261,639 is directed to an optical pulse equalization technique for minimizing pulse dispersion in a single-mode fiber transmission system. (See also, Lin, Kogelnick and Cohen, "Optical-pulse equalization of low-dispersion transmission in single-mode fibers in the 1.3–1.7 μm spectral region", OPTICS LETTERS, Vol. 5, No. 11, November 1980, pp. 476–478.) In the Kogelnick system, the negative dispersion of a transmission fiber is canceled out by the positive dispersion of an equalizer fiber. The lengths of the two fibers are matched based on the ratio of their dispersion values.

The example given in Kogelnick (col. 4, lines 26–56) is transmission of a signal with 5 nm spectral width at 1550 nm over a 100 km transmission fiber with minimum dispersion at 1560 nm, resulting in a dispersion of (−0.8 ps/nm-km) (100 km) (5nm) = −400 psec. A 1350 nm single mode fiber is intended as the equalizer fiber, and since its dispersion at 1550 nm would be approximately 16 ps/nm-km, a 5 km length of equalizer fiber provides a dispersion of 400 psec, and thereby cancels out the total dispersion over the combined link to zero.

In the Lin, Kogelnick and Cohen paper (p. 477, cited above), the example given is a transmission link with a 1 km fiber having zero dispersion at 1510 nm, and a 0.76 km fiber with zero dispersion at 1320. The zero crossing of the total dispersion curve for the combined fibers is measured at 1420 nm.

The system of Kogelnick presents serious problems. For small differences between a transmission fiber's zero dispersion wavelength and the source wavelength, a relatively short length of commercially available equalizer fiber may be used, as explained in the Kogelnick patent. However, as presented in the Lin, Kogelnick and Cohen paper, for large wavelength differences, increasingly long lengths of equalizer fiber are required, and the link-length becomes attenuation limited. Thus, the Kogelnick idea is unworkable in solving the primary problem to which the present invention is directed: a practicable transmission system utilizing a 1550 nm source over a transmission fiber with zero dispersion at 1310 nm.

A similar system, with the same drawbacks is described in Larner and Bhagavatula, "Dispersion Reduction in Single-mode-fibre links", ELECTRONICS LETTERS, Vol. 21, No. 24, Nov. 21, 1985, pp. 1171–72. In this system, 1 km and 2.5 km of standard single mode fiber with zero dispersion at 1310 nm are added to a 60 km link of dispersion shifted fiber with zero dispersion at 1550 nm, to shift the wavelength of zero dispersion for the link toward the source wavelength, 1541 nm. Improved transmission performance was measured and graphed.

Tick et al. U.S. Pat. No. 4,969,710 is directed to yet another dispersion compensation technique, the use of a fluoride glass based fiber to compensate for dispersion in a SiO$_2$-based optical fiber. The zero dispersion wavelength is approximately 2000 nm for the fluoride glass based fiber. In the hypothetical example given, a 1 km SiO$_2$ based standard transmission fiber with zero dispersion at 1320 nm is combined with a 0.454 km fluoride glass fiber with zero dispersion at 2000 nm to achieve zero dispersion for the combined link at the transmission wavelength, 1550 nm (see col. 6, lines 24–36 and col. 7, lines 48–59). Using the standard dispersion convention, the dispersion of the standard fiber at 1550 nm would be about 15 ps/km-nm, and therefore that of the fluoride glass fiber would be about −33 ps/km-nm. (Note, due to a difference in sign convention for the definition of dispersion, the graph of dispersion versus wavelength is upside down in FIGS. 4 and 5 of the Tick et al. patent; for the purposes of the present application, all references shall be to the sign convention and dispersion equation conventionally used in the U.S., as set forth in Agrawal, *Nonlinear Fiber Optics*, Academic Press, Inc., San Diego, Calif., 1989, p. 10.)

Although this technique allows for a shorter length of fluoride glass fiber than the equalizer fiber of Kogelnick et al., it is disadvantageous in that fluoride glass fibers as required in Tick et al. are not commonly available at present.

Byron EPO published patent application 0 089 655 is directed to fibers made of fluoride glass (62 HfF$_4$-33 BaF$_2$-5 LaF$_3$) which have zero material dispersion crossing at about 1600 nm (see FIG. 3). FIG. 3 of Byron suggests that dispersion values as low as −10 ps/km-nm may be possible with dispersion shifted fiber profiles using such fluoride glass.

Numerous other dispersion compensation techniques have been considered in the prior art. Bhagavatula U.S. Pat. No. 4,750,802 is directed to a fiber delay line array for dispersion compensation. Bhagavatula U.S. Pat. No. 4,768,853 is directed to a dispersion compensation system using a segment of multimode fiber as a dispersion transformer. Kafka U.S. Pat. No. 4,913,520 is directed to a pulse compression technique using self-phase modulation to compress a laser output pulse width. Agrawal et al. U.S. Pat. No. 4,979,234 is directed to a pulse compression technique using a saturated semiconductor laser amplifier.

As discussed above, a primary problem to which the present invention is directed is the design and implementation of a transmission system utilizing a source at a given wavelength within the 1550 nm wavelength window over a transmission fiber with zero dispersion at about 1310 nm. This issue is very important commercially, as the overwhelming majority of fiber transmission links installed today are based on optical fiber with zero dispersion at about 1310 nm. The upgrading of existing standard single mode 1310 optimized optical fiber routes to higher capacities is an issue of great concern to long-haul telecommunication providers.

For example, for a 1550 nm system transmitting over a standard step-index single mode fiber, the fiber's positive dispersion level of about 15 ps/km-nm causes distortion of 40 channel (or greater) 50–500 MHz AM video signals and limits link-lengths to less than 5 km. Vodhanel et al., "Performance of Directly Modulated DFB Lasers in 10-Gb/s ASK, FSK, and DPSK Lightwave Systems", JOURNAL OF LIGHTWAVE TECHNOLOGY, Vol. 8, No. 9, September 1990, pp. 1379–1385 indicates that in a 10-Gb/s transmission experiment using direct intensity modulation of a 1550 nm DFB laser and direct detection, transmission over a standard 1300 nm optimized fiber is limited to a length of 3 km before unacceptable bit error rate occurs.

Ideally, the upgrade method for existing 1310 nm optimized links would include both increased data rates and the bypassing of electronic regenerator sites (via longer span capability), so that the existing fiber could be used more efficiently with a minimum of new equipment. In the 1550 nm wavelength window (approximately 1520 nm–1565 nm), erbium-doped optical fiber amplifiers (OFAs) can effectively remove the attenuation loss limitation. However, in the 1310 nm wavelength window, optical fiber amplifiers are not available.

Gnauck et al., "Optical Equalization of Fiber Chromatic Dispersion in a 5-Gb/s Transmission System", IEEE PHOTONICS TECHNOLOGY LETTERS, Vol. 2, No. 8, August 1990, pp. 585–587, is directed to a dispersion equalization technique using a reflective Fabry-Perot interferometer. The system used 64.5 km of standard single-mode fiber with dispersion of 17 ps/km-nm at 1530 nm. The reference acknowledges a loss of 6 dB in the equalization process, but states that the loss could be compensated by optical amplification or reduced by using an optical circulator (col. 2, lines 1–5).

Gysel, "CATV AM Optical Transmission Links Using the 1550 nm Window", Proc. Manual, Fiber Optics 1991, Society of Cable Television Engineers, January 1991, pp. 161–166, is directed to an electrical dispersion compensation circuit which compensates for dispersion generated by 1550 nm transmission over single mode fiber with zero dispersion at 1310 nm. This electronic technique is limited by the narrow operating wavelength range of the filter devices it relies on.

In view of the above-noted problems with dispersion compensating techniques, there remains an important commercial need for a fiber based dispersion compensating system. It is an object of the present invention to provide an all fiber optical transmission link with minimal limitation on link-length due to fiber attenuation and total chromatic dispersion. Another object of the present invention is a simple fiber-based, all-optical dispersion compensation technique that essentially permits 1310 nm optimized fiber to operate in the 1550 nm wavelength window as if it were dispersion-shifted fiber, resulting in a substantial increase in transmission bandwidth and/or reduction in Composite Second Order (CSO) distortion.

A further object of the present invention is an erbium doped optical fiber amplifier system operating at 1550 nm with highly negative dispersion, so that the system can be combined with a transmission link having positive dispersion at 1550 nm, in order to provide dispersion compensation without added attenuation.

It is a further object of this invention to provide a dispersion compensating $SiO_2$—$GeO_2$ glass fiber which provides highly negative total chromatic dispersion in the wavelength range from 1520 nm to 1565 nm. It is a further object of the present invention to provide such a fiber which can be used in relatively short lengths to compensate for the dispersion in standard length links of fiber optimized for transmission at 1310 nm. Yet another object of the present invention is such a dispersion compensating fiber with low attenuation, not greater than 5 times the attenuation per km of commercially available standard fiber, and preferably less than 3 times.

A further object of this invention is the creation of fibers with total dispersion versus wavelength curves whose slopes are controlled to provide dispersion flattening for a particular link in the 1550 nm wavelength range. This feature is described herein as "slope compensation", and it allows the creation of a relatively broad wavelength window for either multiplexing several signals on one fiber or for greater latitude on the average wavelength and spectral width of the transmitting laser. In one embodiment of the present invention, the slope of the dispersion curve is in the range from 0 to −1.2 ps/nm$^2$-km.

SUMMARY OF THE INVENTION

These and other objects are achieved by the present invention, which in one embodiment comprises a silica based dispersion compensating optical waveguide fiber having a refractive index profile tailored to generate negative waveguide dispersion such that the total dispersion of said fiber is less than −20 ps/nm-km at a given wavelength within the range from 1520 nm to 1565 nm, the attenuation of said fiber at said given wavelength being less than 1 dB/km.

In a further embodiment, the invention comprises a dispersion compensated optical transmission link comprising the serial combination of at least 40 km of standard single-mode transmission fiber optimized for low dispersion operation at a wavelength in the range between 1290 nm and 1330 nm, and a dispersion compensating optical waveguide fiber having a refractive index profile tailored to generate negative waveguide dispersion with a length less than about one-half that of said standard single-mode transmission fiber, such that the total dispersion per nm of source spectral width of said dispersion compensated optical transmission link is less than 300 ps/nm at a given wavelength in the wavelength range from 1520 nm to 1565 nm.

In yet another embodiment, the invention comprises a dispersion compensator for use with a standard single-mode transmission fiber optimized for low dispersion operation at a wavelength in the range between 1290 nm and 1330 nm, said compensator comprising an optical fiber amplifier connected in series with a dispersion compensating fiber having negative total chromatic dispersion at a given wavelength within the range from 1520 nm to 1565 nm, said optical fiber amplifier providing amplification at said given wavelength.

In another embodiment, the invention comprises an optical transmission system comprising an optical source operating at a given wavelength within the range from 1520 nm to 1565 nm, an optical detector, an optical transmission fiber, a dispersion compensating fiber and an optical fiber amplifier serially connected between said source and detector, said transmission fiber being optimized for low dispersion operation at a wavelength in the range between 1290 and 1330 nm, said dispersion compensating fiber having a refractive index profile tailored to generate negative waveguide dispersion such that the total dispersion of said fiber is less than −20 ps/nm-km at a given wavelength within the range from 1520 nm to 1565 nm.

DETAILED DESCRIPTION

Figure 1:
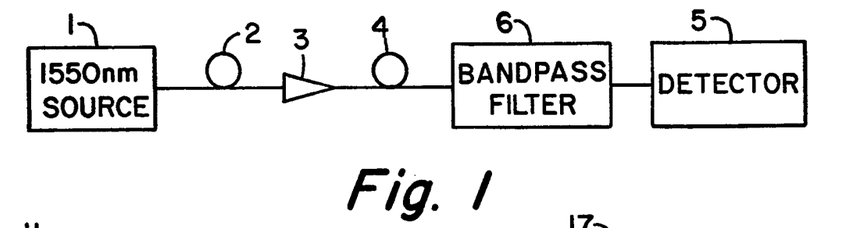
FIGS. 1–4 are block diagram representations of particular systems which include the amplifier and dispersion compensating fiber of the present invention.

The transmission system of the present invention utilizes a number of system components, which are depicted in FIG. 1. 1550 nm source 1 is launched into a transmission link 2 comprising a standard single-mode optical fiber with zero dispersion at a wavelength such as 1310 nm in the range from 1290 nm–1330 nm (hereinafter "1310 nm transmission link"). At the end of the 1310 nm transmission link 2, the signal is coupled into an erbium doped optical fiber amplifier (OFA) 3. Such amplifiers are well known: see, e.g., U.S. Pat. Nos. 4,959,837, 5,005,175 and 5,067,789. In accordance with one embodiment of the present invention, the amplified signal is then coupled into dispersion compensating fiber 4. Dispersion Compensating fiber 4 may be positioned on either side of OFA 3 in the transmission link. In some embodiments, dispersion compensating fiber 4 may be used without an OFA, depending on the length of transmission link 2. Bandpass filter 6 is used to filter unwanted amplified spontaneous emission (ASE) from the OFA 3 before the signal is sent to detector 5.

In an alternative embodiment of the invention OFA 3 and dispersion compensating fiber 4 may be replaced by a distributed fiber amplifier which comprises a fiber with the refractive index profile of dispersion compensating fiber 4, and also includes Er-doping in the core, with or without alumina added to enhance the optical amplifier performance. Compare, Tanaka et al. "Attenuation Free, Dispersion Shifted Fiber Doped with Distributed Erbium", *Technical Digest on Optical Amplifiers and Their Applications*, 1990, Optical Society of America, Vol. 13, pp. 138–141, which is directed to a dispersion shifted fiber with Er doping distributed in the core.

When the signal is coupled into dispersion compensating fiber 4, it may be unintelligible due to the positive dispersion induced in transmission link 2. The inventive dispersion compensating fiber 4 provides a practical, low cost, low attenuation means of equalizing the dispersed pulses and rendering the signal readable as it is received by detector 5. Where OFA 3 provides suitable levels of optical amplification, an additional transmission link may be substituted for detector 5 in order to increase the length of the total transmission link.

These system configurations allow for longer link-lengths than otherwise would be allowed by the dispersion limit associated with the 1310 nm fiber.

Figure 2:
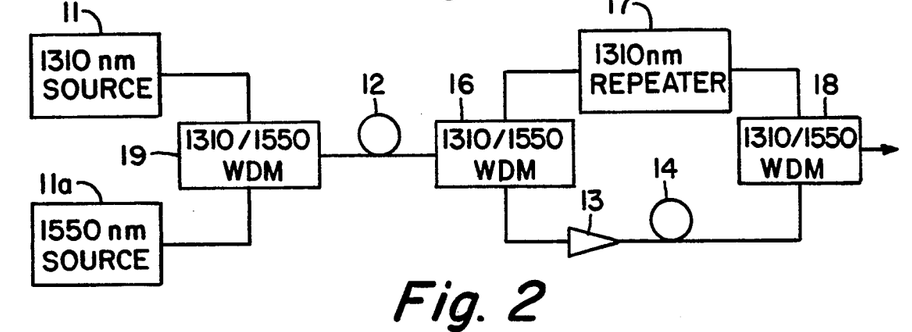

FIG. 2 depicts an alternative embodiment of the present invention which allows high bit-rate propagation of 1310 and 1550 nm signals simultaneously. WDM coupler 19 couples the signals from 1310 nm source 11 and 1550 nm source 11a into 1310 nm transmission link 12. WDM coupler 16 at the output of 1310 nm transmission link 12 divides the two signals based on their wavelengths. Such couplers are conventional: see, e.g. U.S. Pat. Nos. 4,938,556, 4,941,726 and 4,955,025. The 1310 nm signal is processed by conventional repeater 17, and the 1550 nm signal is amplified by OFA 13 and its dispersion is compensated by dispersion compensating fiber 14. The regenerated 1310 nm signal and the amplified dispersion compensated 1550 nm signal are recombined by WDM coupler 18 for re-introduction in a further transmission link.

Figure 3:
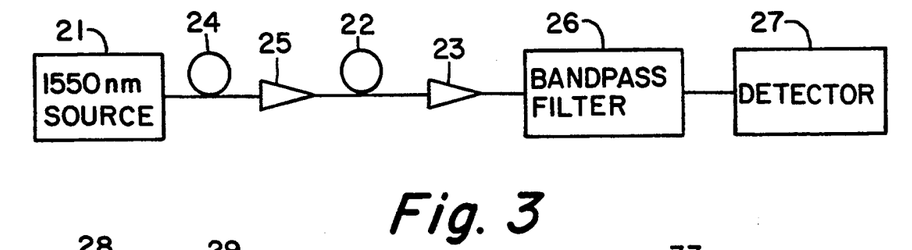

FIG. 3 depicts another embodiment of the present invention where 1550 nm source 21 is launched into dispersion compensating fiber 24, which pre-distorts the 1550 nm signal to be amplified by OFA 25 so that after propagation through the following length of 1310 nm transmission fiber 22, total chromatic dispersion is substantially canceled out. The dispersion compensated signal from 1310 nm transmission fiber 22 is amplified by OFA 23, filtered by optical bandpass filter 26 and received by detector 27.

Figures 4, 5:
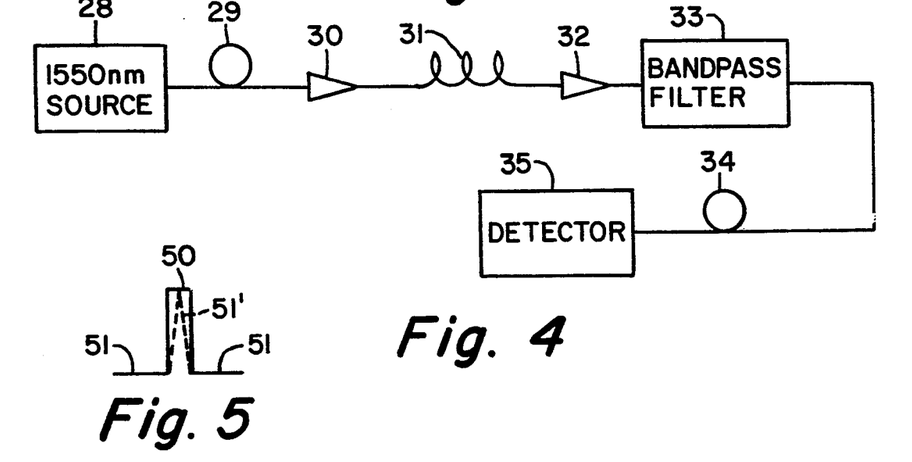
FIGS. 5–8a depict refractive index profiles for various dispersion compensating fiber designs according to the present invention.

FIG. 4 depicts an alternate embodiment which allows high bit-rate propagation of 1550 nm signals over very long 1310 nm transmission links. Source 28 introduces signals into dispersion compensating fiber 29 to pre-distort the 1550 nm signal subsequently amplified by OFA 30, so that after propagation through a long length of 1310 nm transmission fiber 31, total chromatic dispersion may be only partially compensated. The weak signal is amplified by OFA 32, filtered by band pass filter (BPF) 33 and corrected for dispersion by dispersion compensating fiber 34 prior to reaching detector 35. This embodiment may permit the longest unrepeated distance of 1550 nm transmission over 1310 nm transmission links at a given high bit-rate.

The method of length calculation for the dispersion compensating fiber is illustrated by the following example with respect to the system depicted in FIG. 1. For a 50 km transmission fiber 2, with dispersion of about 15 ps/km-nm at 1550 nm, the total transmission fiber dispersion per nm of source spectral width is 750 ps/nm. In one embodiment of the present invention, dispersion compensating fiber 4 has a dispersion of $-30$ ps/nm-km, necessitating a 25 km length in order to completely compensate for the positive dispersion in the 50 km transmission link. This length value need not be exact; any imprecision will result in dispersion, but a certain level of dispersion, depending upon system parameters, is acceptable in conventional systems. The lengths of the transmission fiber and the dispersion compensating fiber may be varied to fine tune a system to zero crossing for a particular transmission wavelength (typically in the range from 1520 nm–1565 nm). In the dispersion compensating transmission systems of the present invention, the required length of the dispersion compensating fiber is preferably not greater than about one-half the length of the 1310 nm transmission link fiber, and the total dispersion of the entire dispersion compensated transmission link at 1550 nm, per nm of source spectral width, is less than about 300 ps/nm. Preferably, the dispersion of the dispersion compensating fiber at the transmission wavelength should be $-20$ ps/nm-km or more negative, in order to insure that the required length of dispersion compensating fiber is not greater than one-half the length of the 1310 nm transmission link fiber, as the dispersion of the 1310 nm transmission link fiber in the 1550 nm wavelength window is about 15 ±5 ps/nm-km.

The attenuation of the standard single-mode transmission fiber 2 is on the order of about 0.2 dB/km, for a link attenuation of about 10 dB. If the attenuation of dispersion compensating fiber 4 is on the order of 0.5 dB/km, dispersion compensating fiber 4 adds 12.5 dB of attenuation to the system, which may be easily eliminated with OFA 3. Preferably, the attenuation of the dispersion compensating fiber is $\leq 1$ dB/km.

A Figure of Merit for a dispersion compensating fiber is the fiber dispersion per km divided by the fiber attenuation per km at the nominal transmission wavelength. The Figure of Merit for the dispersion compensating fiber in the previous example would be $-60$ ps/nm-dB (note: the lower {more negative} the Figure of Merit, the better the performance).

To enable practical implementation of an all fiber optical dispersion compensation system, the Figure of Merit should be in the range of $-40$ ps/nm-dB or more negative, and preferably more negative than $-120$ ps/nm-dB. These ranges are based on the maximum system attenuation that may be added while keeping the dispersion compensating fiber at a practical length in terms of cost and packaging in existing telecommunications enclosures. Preferably, the maximum attenuation added by the length of dispersion compensating fiber should be $< 30$ dB, so that the loss can be overcome (made up for) with one or two amplifiers, which at the same time overcome the loss in the transmission fiber.

In system applications, and especially in combined amplifier/dispersion compensating fiber components, the dispersion compensating fiber is typically provided on a reel within an enclosure or amplifier housing. Accordingly, the preferred maximum practical length for the dispersion compensating fiber is about 30 m when packaged with a single optical fiber amplifier to form a dispersion compensator.

The target value for accurate slope compensation is calculated according to the following equation (1):

$$\frac{S_{dcf}}{D_{dcf}} = \frac{S_{tf}}{D_{tf}} \tag{1}$$

where:
$S_{dcf}$ is the slope of the dispersion versus wavelength curve for the dispersion compensating fiber across the region ±25 nm of the transmission wavelength
$S_{tf}$ is the slope of the dispersion versus wavelength curve for the transmission fiber across the region ±25 nm of the transmission wavelength
$D_{dcf}$ is the dispersion at the transmission wavelength for the dispersion compensating fiber
$D_{tf}$ is the dispersion at the transmission wavelength for the transmission fiber For standard single mode fiber optimized at 1310 nm, with a transmission wavelength of 1550 nm, $S_{tf}=0.06$ ps/nm²-km, and $D_{tf}=15$ ps/nm-km. Assuming a value of $D_{dcf}=-60$, the value of $S_{dcf}$ should be on the order of $-0.24$. The range of $S_{dcf}$ is limited by bend-edge, combined with the problems resulting from over compensating the slope, to about 0 to 1.2 ps/nm²-km. Although in matched clad standard single mode fiber $D_{tf}$ is about 15 ps/nm-km, the value varies for different fibers designs and different transmission wavelengths in the 1550 nm wavelength window (1520 nm to 1565 nm). $D_{tf}=15\pm5$ ps/nm-km within the 1550 nm wavelength window, depending on the design parameters of the standard single mode fiber, such as Delta and core radius, and the nominal transmission wavelength selected in the 1550 nm window.

In one preferred embodiment intended for slope compensation, to avoid over-compensating for $S_{tf}$, the average slope $S_{dcf}$ should be within the range from zero to two times the value given by Equation (1), or $$0 \geq S_{dcf} \geq 2D_{dcf}(S_{tf}/D_{tf}) \tag{2}$$

It should be noted that the present invention is not restricted to digital or AM-video transmission, but may be suitably applied to both.

EXAMPLES OF FIBERS

One embodiment of the dispersion compensating fiber is a single-mode fiber which generates extremely negative waveguide dispersion by means of a ring/segmented core design to achieve a highly negative value of total chromatic dispersion.

FIGS. 5–8a depict five specific optical fiber refractive index profile classes which can be in connection with the dispersion compensating fiber of the present invention. The profile classes in FIGS. 5 and 6 may be dispersion compensating. The profile classes in FIGS. 7, 8 and 8a may be designed to be both dispersion and slope compensating or simply dispersion compensating.

Each of the profile classes includes a central core region 50 with relatively large refractive index delta as compared with the refractive index of the cladding 51, as well as relatively narrow width, as compared with conventional step index single-mode fibers. The profile classes in FIGS. 6, 8 and 8a include core rings 52 (and 102) spaced from the central core region and having refractive index delta smaller than the delta for central core region 50. The profile classes in FIGS. 7, 8 and 8a include depressed index—depressed below the index of cladding 51 (and 101)—core moats 55 between the central core region and the core ring. The index depression of the core moats may be provided by adding a negative dopant, e.g., fluorine, to the core moats, or by providing $SiO_2$ core moats and raising the index of cladding 51 (and 101), e.g., by doping with $GeO_2$. Another profile class, a cone, is depicted by dashed lines 51'. Table I refers to profile 50, not profile 51'.

The major factors that affect dispersion compensation performance for these profile classes are: i) a high peak delta in the central core region; and, ii) a small radius for the central core region. The compensation is sensitive to radius, but the length of the dispersion compensating fiber used in a system may be adjusted to compensate for variation in manufactured radius. There is a trade-off between the amount of compensation and the resistance of the fiber to bend loss. A useful concept is "bend-edge", or the wavelength at which a straight fiber will no longer hold the fundamental mode. Profile classes 6, 8 and 8a, with a core ring, can be designed to provide greater dispersion compensation than the non-ringed profile classes of FIGS. 5 and 7 for a given bend loss.

Figure 6:
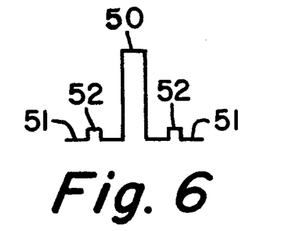

The cut-off wavelength for a single mode optical fiber must be below the transmission wavelength, or multiple modes will propagate. In addition, for the profiles with high delta central core region and core rings, as depicted in FIGS. 6, 8 and 8a, where the bend-edge wavelength may be as near as approximately 150 nm above the cut-off wavelength, the cut-off wavelength may be tailored so that the nominal transmission wavelength is approximately midway between the cut-off wavelength and the bend-edge wavelength. This provides an optimum combination of low attenuation and highly negative dispersion. The bend-edge for profile classes 5 and 7 is not as sensitive to bend-edge, as the spacing between bend-edge wavelength and cut-off wavelength is typically on the order of 800 nm for these designs.

There is also a trade-off between dispersion compensation and slope compensation. To compensate for the slope, the ratio of the dispersions at 1525 nm and 1575 nm for the dispersion compensating fiber should be about the same as the ratio of those dispersions in the transmitting fiber, i.e., about 1.2 for standard step-index single mode fiber optimized for transmission at 1310 nm (see also the equation (1) above).

The profile classes in FIGS. 5–8 may be further modified by modifying the step changes in index shown for the central core regions, the core rings and the core moats. The cores may have other refractive index profiles including $\alpha$ profiles. The term $\alpha$ profile is used herein to mean that the refractive index of the central core region is defined by the equation $n(r) = n_1 [1 - \Delta(r/a)^\alpha]$ where $n_1$ is the refractive index at the fiber axis, $\Delta = (n_1^2 - n_2^2)/2n_1^2$, $n_2$ is the cladding index, r is the radius and a is the outer radius of the central core region. The triangular or cone-shaped curve 51' of FIG. 5 represents an $\alpha$ profile wherein $\alpha = 1$. A parabolic variation in refractive index occurs when $\alpha = 2$. Parabolic or triangular cores (referred to in the following tables as "cone" profiles), and tapered rings provide slightly better dispersion compensation. In addition, the central cores may have pedestals around their bases.

The profile class depicted in FIG. 8a is believed to provide manufacturability benefits, as the region 103 may include an interface between the core cane and the overclad (see discussion of these manufacturing process steps in the section on Fiber Manufacture below). It is difficult to deposit $GeO_2$—$SiO_2$ soot (glass particles) on a $GeO_2$—$SiO_2$ cane and at the same time avoid seeds and maintain a consistent doping level and consequently a uniform refractive index level. In the FIG. 8a design, the cladding is preferably $GeO^2$ doped $SiO_2$, and the inner and outer core moat regions 105 and 103 are preferably undoped $SiO_2$.

Table I gives calculated values of relevant properties for specific profile examples. Data not available is indicated by "*".

TABLE I

Figure 7:
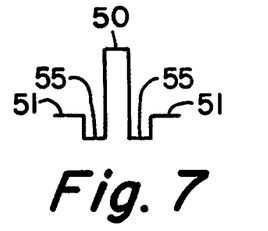
Figure 8:
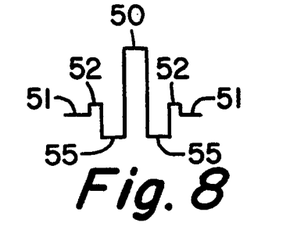
Figure 8A:
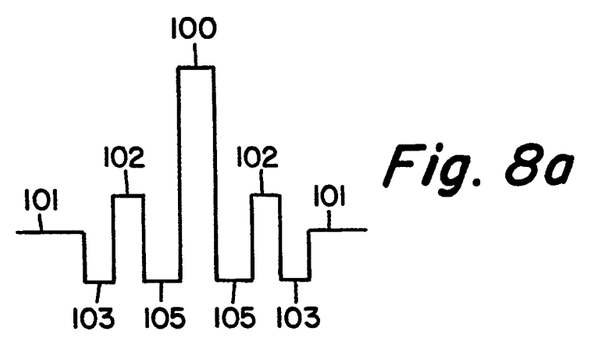
Figure 9:
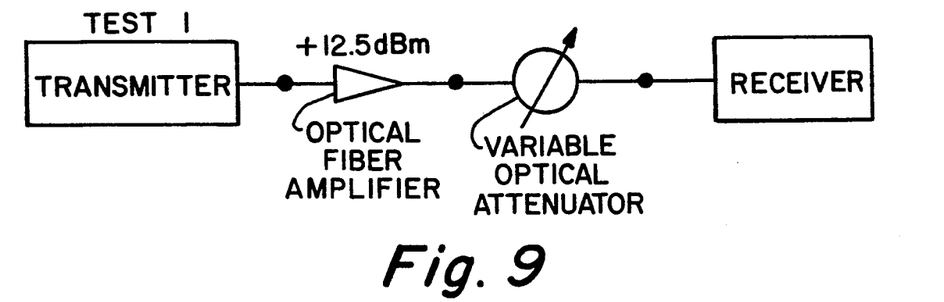
FIGS. 9–12 are block diagram representations of the four system component configurations used in System Example 1, and correspond with the data in Table III.
Figure 10:
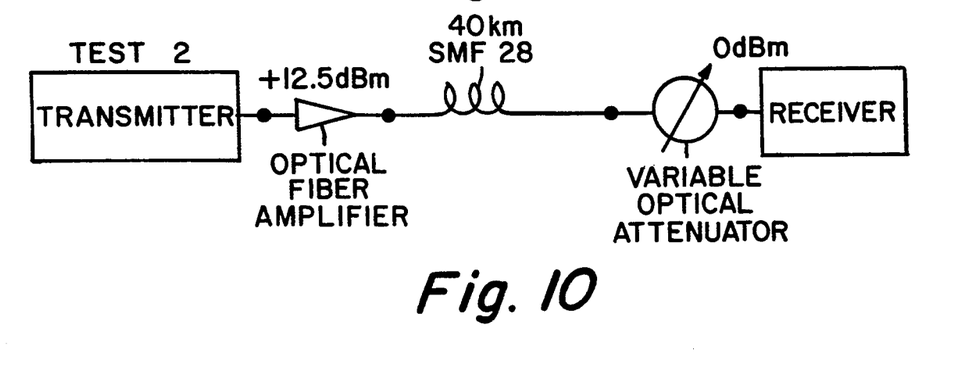
Figure 11:
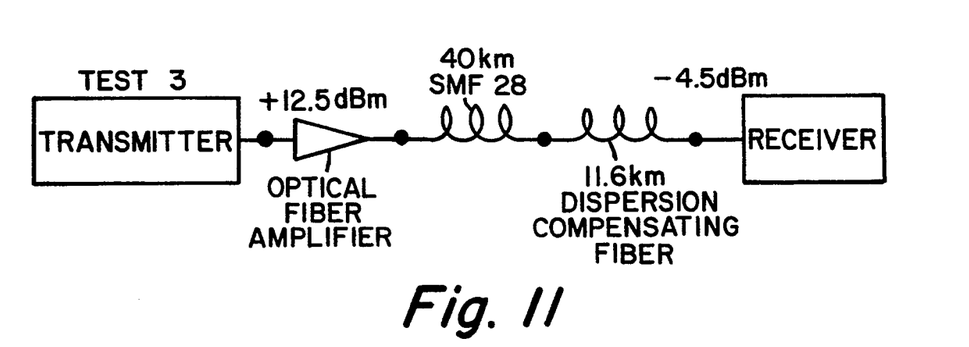
Figure 12:
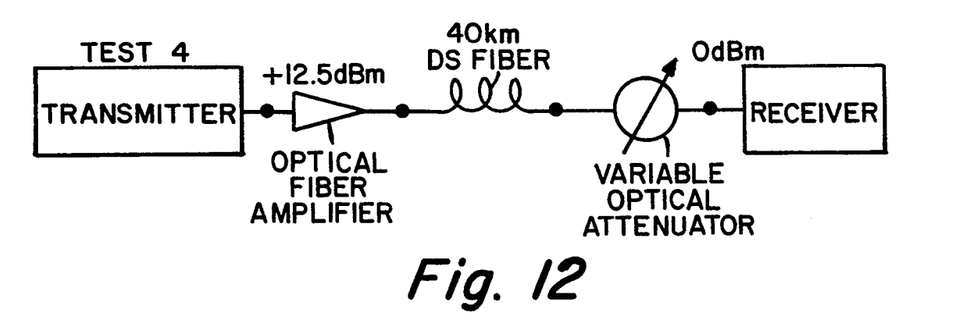

| Profile Class | FIG. 5 | FIG. 5 | FIG. 5 | FIG. 6 | FIG. 7 | FIG. 8 | FIG. 8 | FIG. 8 | FIG. 8a |
|---|---|---|---|---|---|---|---|---|---|
| Core | | | | | | | | | |
| Shape | Cone | Step | Cone | Step | Step | Step | Step | Step | Step |
| Delta, % | 2.0 | 2.0 | 1.08 | 1.42 | 1.50 | 1.56 | 1.60 | 1.8 | 1.78 |
| Radius, μm | 1.5 | 1.36 | 2.18 | 1.19 | 1.47 | 1.44 | 1.43 | 1.5 | 1.35 |
| Moat | | | | | | | | | |
| Delta, % | — | — | — | 0.0 | −0.50 | −0.44 | −0.40 | −0.20 | −0.22 |
| Radius, μm | — | — | — | 2.5 | 4.30 | 3.76 | 4.87 | 3.7 | 4.6 |
| Ring | | | | | | | | | |
| Delta, % | — | — | — | 0.23 | — | 0.20 | 0.32 | 0.16 | 0.14 |
| Radius, μm | — | — | — | 3.7 | — | 6.50 | 6.50 | 7.9 | 9.46 |
| Dispersion (ps/km-nm) | −50 | −49 | −30 | −30 | −55 | −101 | −70 | −70 | −61 |
| Slope Ratio | * | * | 0.9 | 0.8 | 1.2 | 1.0 | 1.2 | 1.2 | 1.07 |
| Cutoff, nm | <1000 | <1000 | <1000 | <1000 | 850 | 1479 | 1400 | 1450 | 1330 |
| Mode Field Diameter | 5.4 | 6.1 | 7.6 | 6.5 | 4.4 | 5.2 | 4.6 | 5.0 | 4.5 |

TABLE I-continued

| Profile Class | FIG. 5 | FIG. 5 | FIG. 5 | FIG. 6 | FIG. 7 | FIG. 8 | FIG. 8 | FIG. 8 | FIG. 8a |
|---|---|---|---|---|---|---|---|---|---|
| Bend-edge, nm | * | * | * | * | 1700 | 1805 | 1800 | 1800 | 2277 |

By means of the inventive dispersion compensating optical fiber described below, we have been able to achieve the following levels of negative dispersion and attenuation with the resulting Figures of Merit as indicated in Table II:

TABLE II

| Fiber I.D. | 7873-01 | 7873-02 | 7939-011-016 | 7-8015-01-03 |
|---|---|---|---|---|
| Central Core | | | | |
| Shape | Cone | Cone | Step | Step |
| Delta, % | 1.4 | 1.4 | 2.0 | 2.0 |
| Radius, μm | 1.5 (base) | 2.0 (base) | 1.5 | 1.5 |
| Moat | | | | |
| Delta, % | — | — | — | 0.0 |
| Radius, μm | — | — | — | 3.7 |
| Ring | | | | |
| Delta, % | — | — | — | 0.4 |
| Radius, μm | — | — | — | 7.9 |
| Dispersion (ps/km-nm) | −50.7 (1535) | −30.4 (1535) | −45 (1550) | −65.5 (1550) |
| Slope Ratio | 0.8 | 0.8 | 0.8 | 1.0 |
| Cutoff, nm | 930 | 980 | <800 | 1521 |
| Mode Field Diameter | 5.93 | 4.88 | * | * |
| O. D., μm | 80 | 107 | 115 | 85 |
| Attenuation (dB/km) | 0.78 | 0.71 | 0.6 | 0.48 |
| Bend-edge, nm | * | * | 1680 | 1680 |
| Figure of Merit | −65 | −43 | −75 | −136 |

Notes regarding the terms used in Tables I and II:
  the Delta values for the central core region, the core ring and the core moat are all percentages of the refractive index of the cladding.
  the ring radius is measured to the outer edge of the ring
  the moat radius is measured to the inner edge of the ring
  the slope ratio is the dispersion at 1575 nm divided by the dispersion at 1525 nm
  the dispersion was measured at the wavelength indicated within the parentheses

FIBER MANUFACTURING PROCESS

The dispersion compensating fibers of the present invention can be made by standard fiber manufacturing processes, such as Vapor Axial Deposition (VAD), Outside Vapor Deposition (OVD) or Modified Chemical Vapor Deposition (MCVD). The fibers referenced in Table II were made by the OVD process. The OVD process is described in numerous published patents such as: Berkey U.S. Pat. No. 4,486,212; Powers U.S. Pat. No. 4,125,388; Backer U.S. Pat. No. 5,067,975; Blankenship U.S. Pat. No. 4,314,837; and, Bhagavatula U.S. Pat. No. 4,715,679. Relevant portions of these references are hereby incorporated by reference.

Fiber I.D.s 7873-01 and 7873-02 were made by a double overclad process as follows. A core preform for a 62.5 μm core diameter graded index multimode fiber was manufactured by a standard OVD process (deposition of glass particles on a mandrel and removal of the mandrel) and consolidated and stretched into cane (redrawn). The peak core composition was silica doped with 36 wt. % $GeO_2$. Such a deposition and redraw process is described in the Berkey patent and the Backer patent referenced above. This 7 mm diameter cane was overclad with $SiO_2$ soot to a soot diameter of 80 mm and then dehydrated and consolidated to form a glass blank. The glass blank was redrawn into a cane with an outer diameter of approximately 7 mm. The first overclad cane was again overclad with a second $SiO_2$ soot layer to a soot diameter of 58 mm. This overclad soot preform was dehydrated and consolidated into the final glass blank. The final glass blank was then drawn into fiber (with standard coating).

The blank was drawn to an outside fiber diameter (glass fiber O.D.) which varied from 107 μm to 80 μm. Portions of this fiber were measured and it was determined that the dispersion compensation performance improved with decreasing core diameter. The 80 μm fiber was sensitive to bend-edge on a standard shipping reel. The core profile was a stretched parabolic solid, and as such resembled a thin cone (see 51' in FIG. 5). In total, 3.1 km of Fiber I.D. 7873-01 (80 μm O.D.) and 3.3 km of Fiber I.D. 7873-02 (107 μm O.D.) were drawn and measured.

Fiber I.D.s 7939-011 to -016 comprise six fibers drawn from a blank manufactured by the OVD process with a single overclad step. First, the core preform was deposited on a mandrel with a high delta step index profile and a target $GeO_2$ concentration of 40 wt. % in $SiO_2$. The core preform had a layer of pure $SiO_2$ deposited on its outside surface (to create a core/clad ratio of 0.15) and a soot diameter of 74 mm. This core preform was dehydrated and consolidated by conventional chlorine drying and redrawn to a core cane with an outside diameter of 7 mm. The core cane was overclad with $SiO_2$ to a soot diameter of 85 mm. This final preform was dehydrated and consolidated into the final glass blank for drawing into fiber.

Prior to drawing (and coating) into long lengths of fiber, a portion of the blank for 7939-011 to -016 was drawn into a 2 km length with fiber O.D. (glass) varying from 110 μm to 85 μm. The dispersion for different diameter portions of this 2 km length was measured, yielding values of −17 ps/nm-km for the 110 μm diameter and −45 ps/nm-km for the 85 μm diameter. Thereafter, six fibers were drawn from the remainder of the blank as follows: 7939-011 (30.7 km); -012 (7 km); -013 (15.9 km); -014 (12.7 km); -015 (6.7 km); and, -016 (11.6 km). The measured properties for these six fibers were consistent, and they are set forth in Table II above.

Fiber I.D.s 7-8015-01 to -03 comprised three fibers drawn from a blank manufactured by the OVD process with a single overclad step. First, the core preform was deposited on a mandrel with a high delta step index central core region having a target $GeO_2$ concentration of 40 wt. % in $SiO_2$, surrounded by a reduced delta core ring with a target concentration of 8 wt. % $GeO_2$ in $SiO_2$. The core preform had a thin layer of pure $SiO_2$ deposited on its outside surface, and a soot diameter of 74 mm. This core preform was dehydrated and consolidated by conventional chlorine drying and redrawn to a core cane with an outside diameter of 7 mm. The core cane was overclad with $SiO_2$ to a soot diameter of 82 mm. This final preform was dehydrated and consolidated into the final glass blank for drawing into fiber (with standard coating).

The lengths of Fiber I.D.s 7-8015-01 to -03 were 6.4 km (-01), 11 km (-03) and 22 km (-02). The measured properties for these three fibers were consistent, and they are set forth in Table II above.

It should be noted that the fiber designs with moats can be made with conventional fiber manufacturing processes. The moats may be depressed regions created by doping with an index decreasing dopant, such as fluorine, or they may be pure silica, in which case a $GeO_2$-doped silica cladding is employed.

The dispersion of the fibers was measured by standard dispersion measurement techniques as described in Fiber Optic Test Procedure EIA/TIA-455-168. These measurements might be improved by splicing short sections of standard step index single mode fiber on the two ends of the dispersion compensating fiber to insure that the light launched into the dispersion compensating fiber is single mode.

SYSTEM EXAMPLE 1

A test of dispersion compensating fiber in a 40 channel AM video test was conducted based on a system as depicted in FIGS. 9–12. The test results are shown in Table III.

the interaction of laser chirp and fiber dispersion degraded the CSO 12.8 dB at 55.2 megahertz and 24.25 dB at 325.25 megahertz as compared to the base. These are relatively large changes, particularly at the 325.25 megahertz frequency, and they degraded the CSO level to the point that the test did not meet the minimum specification of a typical AM backbone transmission system, which may be characterized as carrier-to-noise ratios greater than 50 dB, CSO levels less than −60 dB, and CTB levels less than −65 dB.

In Test #3 of Table III (FIG. 11), 11.6 kilometers of dispersion compensating fiber (Fiber I.D. 7939-016 which is described above) were added to the system of Test #2 to correct for CSO distortion. As shown by the performance data, this system corrected for a substantial fraction of the added distortion at both RF frequencies as compared to the base. At 55.25 megahertz, it corrected for 11.4 dB of the 12.8 dB added distortion. At 325.25 megahertz, it corrected for 15.5 dB of the 24.2 dB added distortion, leaving 8.7 dB non-corrected.

It is postulated that the fact that this correction was not perfect is due to either an incorrect length of compensating fiber, or the mismatch of the dispersion slope in the dispersion compensating fiber as compared to that of 1310 optimized fiber.

It is also valuable to compare transmission of 1310 nm

TABLE III

| Test # | 40 ch. modulato depth/ch. | Received power level (dBm) | CNR-Corrected at 55.25 MegaHz | CNR-Corrected at 325.25 MegaHz | CSO at 55.25 MegaHz | CSO at 325.25 MegaHz | CTB at 55.25 MegaHz | CTB at 325.25 MegaHz |
|---|---|---|---|---|---|---|---|---|
| 1 | 4.4 | 0 | 54.1 | 53.6 | 61 | 62 | 75.2 | 73.8 |
| 2 | 4.4 | 0 | 52.5 | 50.1 | 48.2 | 37.8 | 71.9 | 59.5 |
| 3 | 5.9 | −5.0 dBm corrected to 0 | 49.4* | 48.5* | 59.6 | 53.3 | 68.8 | 69.2 |
| 4 | 4.4 | 0 | 51.7 | 51.9 | 59.8 | 60.3 | 73.9 | 72.9 |

*Data adjusted for 0 dBm receiver power level

As shown in Table III and FIGS. 9–12, the same transmitter, receiver and optical fiber amplifier were used in a series of comparative tests. The transmitter was loaded with 40 channel NTSC AM video with modulation depth per channel, and receiver power levels as indicated in Table III. The corrected carrier-to-noise (CNR), Composite Second Order (CSO) and Composite Triple Beat (CTB) distortion levels were measured for each test at 55.25 and 325.25 megahertz. These two frequencies were chosen because they represent the worst case distorted frequencies in the 40 channel spectrum.

The first test (Test #1) in Table III (see FIG. 9) involved establishing a baseline for the combined transmitter and optical fiber amplifier in terms of carrier-to-noise, CSO, and CTB distortion levels. The variable optical attenuator was adjusted to achieve 0 dBm on the receiver. Test #1 is the basis for comparing the degradation due to interaction of laser chirp and fiber dispersion. Transmission with 1310 nm optimized fiber (Test #2) and 1310 nm optimized fiber with dispersion compensating fiber (Test #3) were compared against the results of Test #1.

In Test #2 of table III (see FIG. 10), a 40 kilometer length of standard single-mode fiber (Corning SMF-28, Corning Incorporated, Corning, N.Y. 14831) was installed and the variable optical attenuator adjusted to permit 0 dBm power level on the receiver. In this test, optimized fiber with dispersion compensated fiber against transmission with dispersion shifted (DS) fiber. In test #4 of Table III (see FIG. 12) all the fiber was replaced with 40 kilometers of dispersion shifted fiber optimized for performance at 1550 nm (Corning SMF-DS). It is unlikely that any compensation or transmission network operating at 1550 nm could perform better than the total end to end performance of the dispersion shifted fiber.

As indicated by the data, the dispersion compensating fiber performed well compared to the dispersion shifted fiber test. At 55.25 megahertz, CSO distortion was within 0.2 dB of the distortion value through dispersion shifted fiber, whereas at the higher RF frequency of 325.25 megahertz, it corrected to within 7 dB of the distortion value through dispersion shifted fiber. The CSO distortion was not completely corrected at 325.25 megahertz, but it is believed that this was related to inaccurate length for the dispersion compensating fiber, or a mismatch between the dispersion slope of the transmission fiber and that of the dispersion compensating fiber.

Again, it is postulated that the fact that this correction was not perfect is due to either an incorrect length of compensating fiber, or the mismatch of the dispersion slope in the dispersion compensating fiber as compared to that of 1310 nm optimized fiber.

The compensation method permits standard single mode fiber to operate as if it were dispersion-shifted fiber, significantly decreasing the CSO distortion present in systems transmitting AM video signals at 1550 nm through a 1310 nm transmission link. It is postulated that the slope compensated dispersion compensating fiber will be useful for fully correcting for this CSO degradation through standard single mode fiber.

SYSTEM EXAMPLE 2

Figure 13:
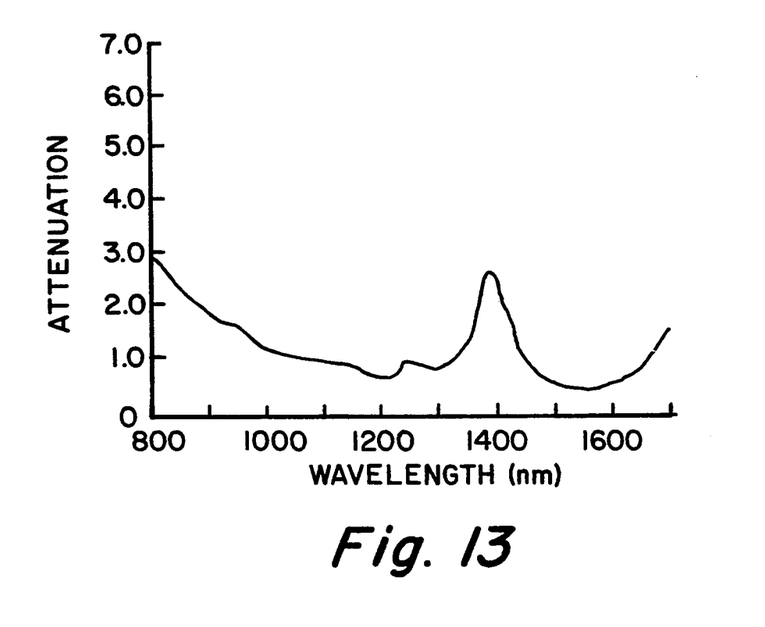
FIG. 13 is a graph of the spectral attenuation for the dispersion compensating fiber used in System Example 2.
Figure 16:
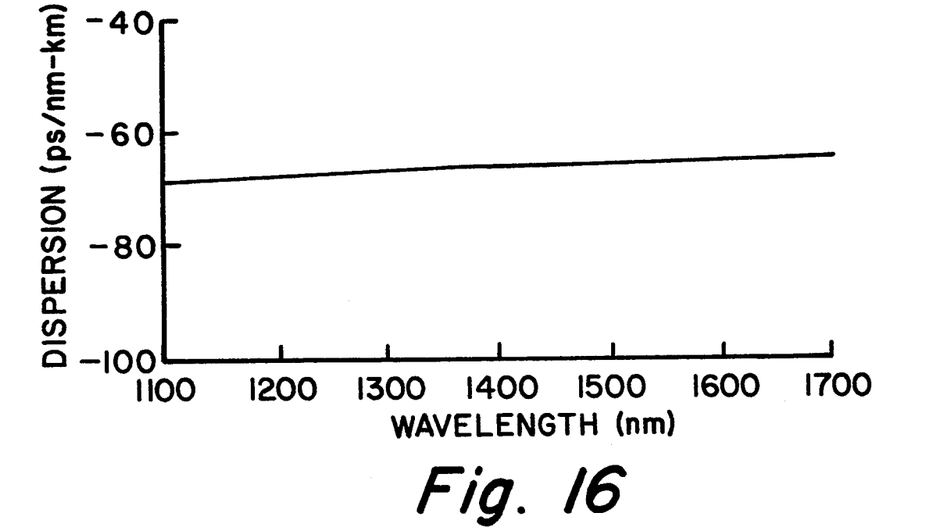
FIG. 16 is a plot of the dispersion versus wavelength curve for the dispersion compensating fiber used in System Example 2.

The dispersion compensating fiber used in this Example comprised the three Fiber I.D. Nos. 7-8015-01 to -03 (39.4 km total) and it exhibited a dispersion of −65.5 ps/nm.km at 1550 nm, which is about four times greater in magnitude than the positive dispersion of standard single mode fiber. The spectral attenuation of this dispersion compensating fiber is shown in FIG. 13. The loss at 1550 nm was 0.48 dB/km. The dispersion for this dispersion compensating fiber is plotted versus wavelength in FIG. 16.

To correct the dispersion of 150 km of standard single mode fiber optimized for 1310 nm transmission, 39 km of dispersion compensating fiber was required, which resulted in 19 dB of excess loss. The loss of the of 1310 nm transmission link and the dispersion compensating fiber was overcome by using three OFAs. Although the required length of dispersion compensating fiber is significant, this dispersion compensating fiber is highly resistant to bending loss and can therefore be spooled onto compact fiber reels.

Figure 14:
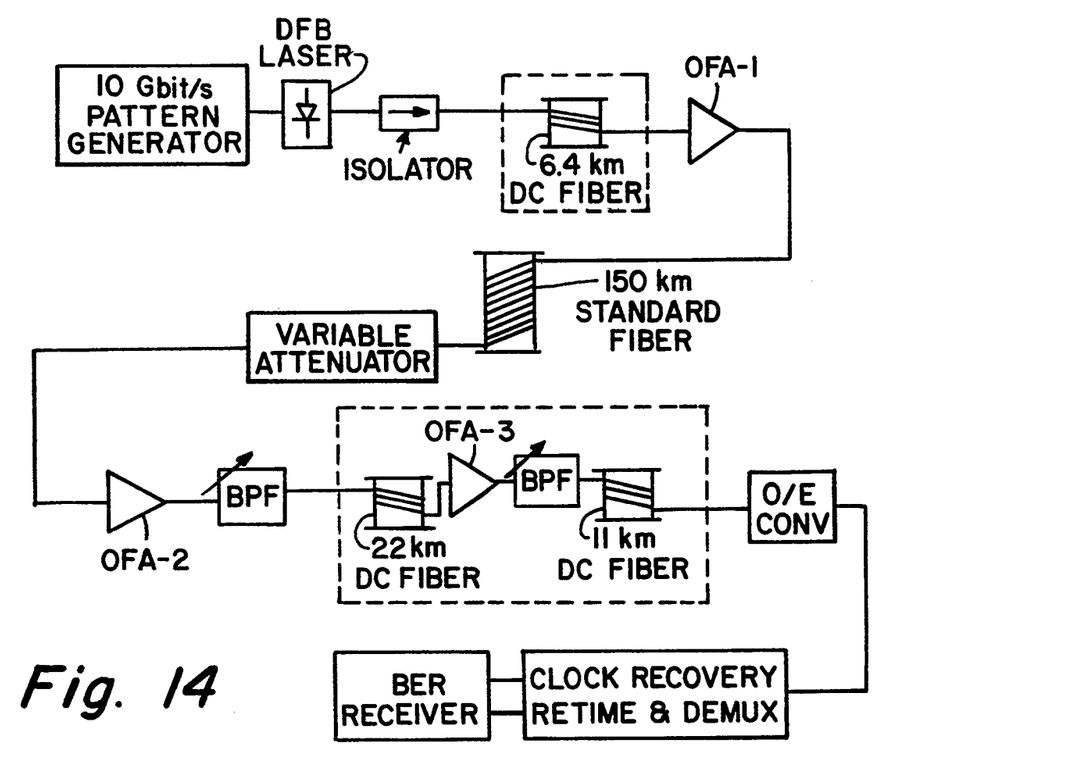
FIG. 14 is a block diagram representation of the system component configuration used in System Example 2.

Since the dispersion compensation is a linear, passive technique the dispersion compensating fiber can be located at the transmit end, the receive end, or an intermediate point of the standard single mode fiber network being compensated, limited only by minimum power levels acceptable to the OFAs or to the optical receiver. In this example, 6.4 km of the dispersion compensating fiber was located at the transmit end of the link, with the remaining 33 km of dispersion compensating fiber at the receive end of the link, as shown in FIG. 14. OFA #1, at the transmit end, was a 980 nm backward-pumped amplifier used as a booster amplifier, with an output power of 11 dBm. The standard 1310 optimized single mode fiber link was 150 km in length, with an end-to-end dispersion of about 2500 ps/nm at 1550 nm, and an attenuation loss of 33 dB. OFA #2 was a 980 nm forward-pumped, 25 dB gain amplifier, followed by a 1.2 nm bandpass optical filter. OFA #3 comprised two 980 nm backward-pumped amplifiers resulting in 31 dB gain, with a saturated output power of +13 dBm, followed by a 3 nm bandpass optical filter. To reduce the noise contribution by OFA #3, the dispersion compensation fiber at the receive end was divided into two sections, thereby increasing the power level at the input of OFA #3. All three OFAs had optical isolators at the inputs and outputs.

A uniform grating DFB laser diode with spectral width of 0.5 nm (measured at −20dBm) was used as the optical source. The laser was driven with a 10 Obit/s NRZ (non-return-to-zero) waveform directly from the test transmitter. The data pattern was a pseudo-random pattern of length $2^{23} - 1$.

The laser optical extinction ratio was approximately 8 to 1. The optical receiver consisted of OFA #2 followed by a 1.2 nm bandpass tunable optical filter, variable optical attenuator, PIN photodiode, and electrical preamplifier. The variable optical attenuator was used to maintain a constant optical level to the PIN photodiode during BER (bit-error-rate) testing. The net sensitivity of the optical receiver was −30 dBm at 1E−12 BER.

Figure 17:
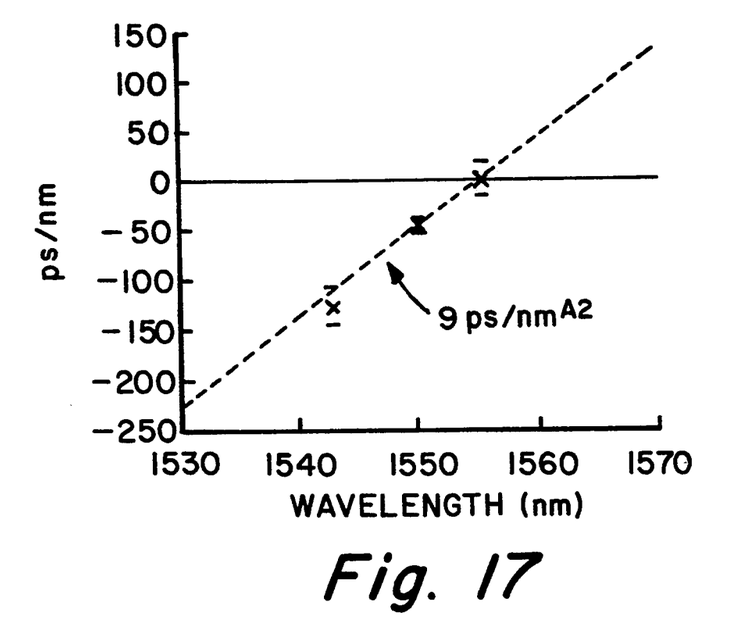
FIG. 17 is a graph of effective dispersion versus wavelength for the dispersion compensated transmission link of System Example 2.

FIG. 17 shows the measured end-to-end chromatic dispersion of the entire optical path including OFAs and dispersion compensating fiber. The dispersion slope that would be expected from 150 km of standard fiber (9 ps/nm²) is superimposed on the data points, indicating reasonably good agreement between the measured and expected values.

Figure 15:
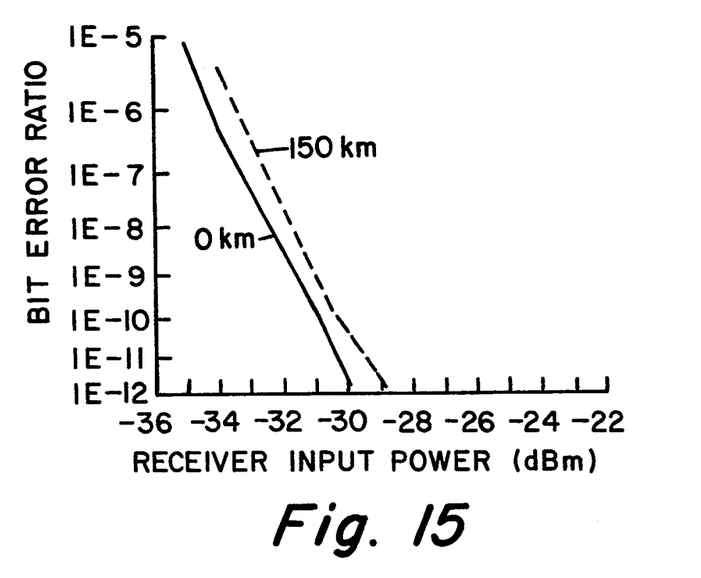
FIG. 15 is a plot of the bit-error-rate test results for System Example 2.
Figure 18A:
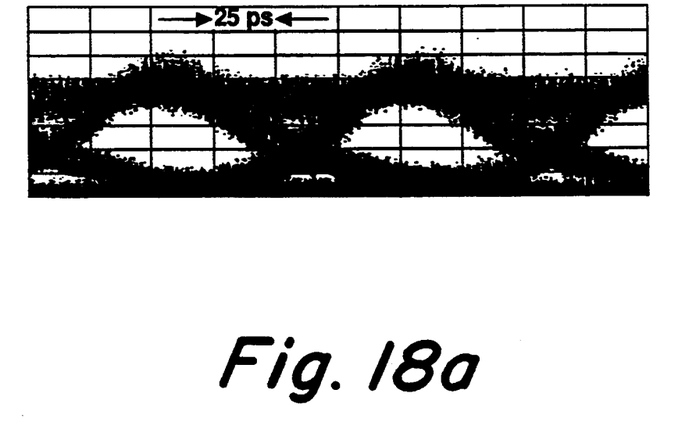
FIGS. 18(a)–(c) depicts the receiver "eye" pattern for the transmission links of System Example 2, normalized, (a), and with, (c), and without, (b), dispersion compensation.
Figure 18B:
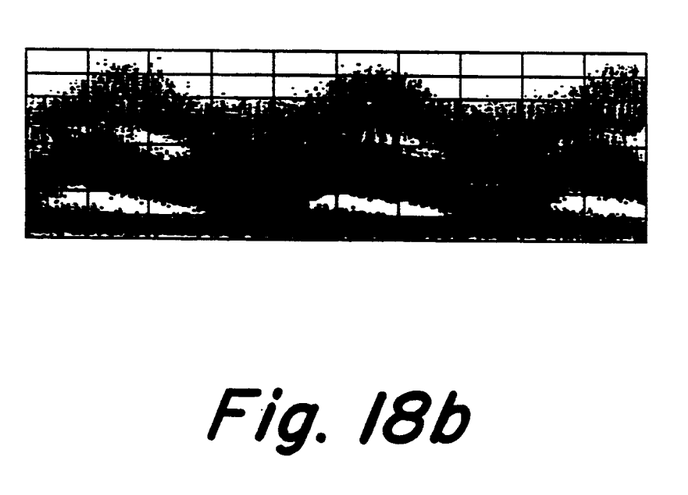
Figure 18C:
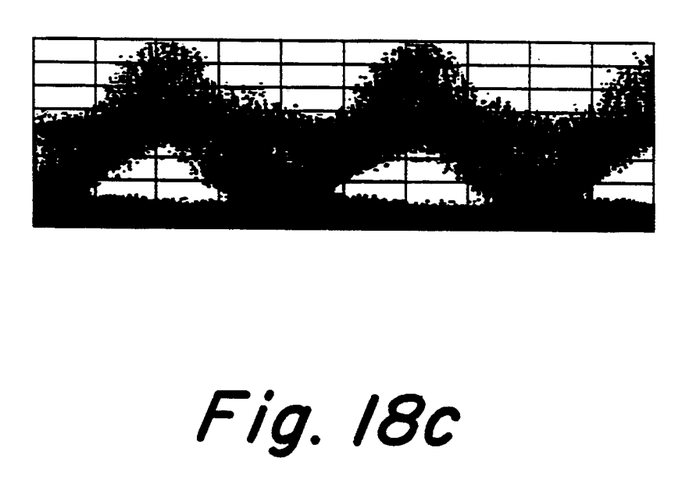

An eye pattern of the optical waveform after transmission through 0.020 km of standard 1310 nm optimized fiber is shown in FIG. 18(a). An eye pattern of the optical waveform after transmission through 12 km of 1310 nm optimized fiber without compensation is shown in FIG. 18(b). An eye pattern after transmission through 150 km of 1310 nm optimized fiber plus 39.4 km of dispersion compensating fiber is shown in FIG. 18(c). As may be surmised from the eye pattern, without dispersion compensation, the system was inoperable through a mere 12 km of standard fiber. However, with the fiber-based optical compensator in place, a receiver power penalty of less than 1 dB is obtained when operating through 150 km of standard fiber, as indicated in the BER graph of FIG. 15.

A simple fiber-based, all-optical dispersion compensation technique that essentially permitted 1310 nm optimized fiber to operate as if it were dispersion-shifted fiber was demonstrated. By compensating the dispersion of the non-dispersion-shifted fiber with this wavelength-tolerant method, the fiber capacity can be made almost independent of bit-rate and source spectral characteristics. This provides a convenient avenue for capacity upgrades, since the available bit-rate-distance product of the fiber is significantly increased.

Although the invention has been described in detail for the purpose of illustration, it should be understood that such detail is solely for that purpose, and variations can be made therein by those skilled in the art without departing from the scope of the invention which is defined by the following claims.

What is claimed:

1. A silica based dispersion compensating optical waveguide fiber having a material dispersion, and having a refractive index profile preselected to generate negative waveguide dispersion such that the total dispersion of said fiber, equal to the sum of said material dispersion and said waveguide dispersion, is less than −20 ps/nm-km at a given wavelength within the range from 1520 nm to 1565 nm, said fiber attenuatinq liqht transmitted along its lenqth, the attenuation of said fiber at said given wavelength being less than 1 dB/km.

2. The fiber of claim 1 wherein the total dispersion versus wavelength curve of said fiber has no zero crossing in the range of wavelengths between 1290 nm and 1565 nm.

3. The fiber of claim 1 wherein the total dispersion of said fiber at said given wavelength divided by the attenuation of said fiber at said given wavelength is less than −40 ps/nm-dB.

4. The fiber of claim 3 wherein the total dispersion of said fiber at said given wavelength divided by the attenuation of said fiber at said given wavelength is less than −120 ps/nm-dB.

5. A silica based dispersion compensating optical waveguide fiber having a material dispersion, and having a reflective index profile preselected to generate negative waveguide dispersion, such that the total dispersion of said fiber, equal to the sum of said material dispersion and said waveguide dispersion is less than −20 ps/nm-km at a given wavelength within the range from 1520 nm to 1565 nm, said fiber attenuating light transmitted along its length, the attenuation of said fiber at said given wavelength being less than 1 dB/km wherein said fiber is designed for single mode transmission at a nominal transmission wavelength and wherein said refractive index profile is preselected to provide a cutoff wavelength located such that said nominal transmission wavelength is approximately midway between said cutoff wavelength and a bend edge wavelength at which a straight fiber will no longer maintain said single mode transmission.

6. The fiber of claim 1 wherein said refractive index profile comprises a central core region of radius R and refractive index delta D surrounded by a cladding region, D and R beinq preselected to generate said negative waveguide dispersion.

7. The fiber of claim 1 comprising a centrally disposed core surrounded by cladding glass of a first refractive index, said core having a central core region of a second refractive index, a layer of glass surrounding said central core region and havinq a third refractive index less than said second refractive index, and a core ring region of a fourth refractive index qreater than said third refractive index and intermediate said first refractive index and said second refractive index.

8. The fiber of claim 1 comprising a centrally disposed core surrounded by cladding glass, said core having a central core region of given refractive index surrounded by a core moat region of refractive index lower than that of said cladding glass.

9. The fiber of claim 1 comprising a centrally disposed core surrounded by cladding glass, said core comprising the following regions named in order of increasing radius: (a) a central core region of given refractive index, (b) a core moat region of refractive index lower than that of said cladding glass, and (c) a core ring region of refractive index intermediate said given refractive index and the refractive index of said cladding glass.

10. The fiber of claim 1 comprising a centrally disposed core surrounded by cladding glass, said core comprising the following regions named in order of increasing radius: (a) a central core region of given refractive index, (b) a core moat region of refractive index lower than that of said cladding glass, (c) a core ring region of refractive index intermediate said given refractive index and the refractive index of said cladding glass, and (d) a second core moat region of refractive index lower than that of said cladding glass.

11. A silica based dispersion compensating optical waveguide fiber having a material dispersion and having a refractive index profile preselected to generate negative waveguide dispersion such that the total dispersion of said fiber, equal to the sum of said material dispersion and said waveguide dispersion, is less than −20 ps/nm-km at a given wavelength within the range from 1520 nm to 1565 nm, and the average slope $S_{dcf}$ of the total dispersion versus wavelength curve of said fiber in the wavelength range between 1520 nm and 1565 nm is determined by the relationship, $$0 \leq S_{dcf} \leq 2 D_{dcf}(S_{tf}/D_{tf})$$

where $D_{dcf}$ is the dispersion of said dispersion compensating fiber, $S_{tf}$ is the average slope of the total dispersion versus wavelength curve in the wavelength range between 1520 nm and 1565 nm, of a standard single-mode transmission fiber optimized for low dispersion operation at a wavelength in the range between 1290 nm and 1330 nm, $D_{tf}$ is the total dispersion of said standard single-mode transmission fiber at a wavelength in the range between 1520 nm and 1565 nm, and $D_{dcf}$ is within the range from −20 to −120 ps/nm-km.

12. The fiber of claim 11 wherein $D_{tf}$ is about 15 ps/nm-km, plus or minus 5 ps/nm-km.

13. A silica based dispersion compensating optical waveguide fiber having a material dispersion, and havinq a refractive index profile preselected to generate negative waveguide dispersion such that the total dispersion of said fiber, equal to the sum of said material dispersion and said waveguide dispersion, is less than −20 ps/nm-km at a given wavelength within range from 1520 nm to 1565 nm, the average slope $S_{dcf}$ of the total dispersion versus wavelength curve of said dispersion compensation fiber in the wavelength range between 1520 nm and 1565 nm is approximately determined by the relationship $$S_{dcf} = D_{dcf}(S_{tf}/D_{tf})$$

where $D_{dcf}$ is the dispersion of said dispersion compensation fiber, $S_{tf}$ is the slope of the total dispersion versus wavelength curve in the wavelength range between 1520 nm and 1565 nm, of a standard single-mode transmission fiber optimized for low dispersion operation at a wavelength in the range between 1290 nm and 1330 nm, and $D_{tf}$ is the total dispersion of said standard single-mode transmission fiber at said given wavelength.

14. A dispersion compensated optical transmission link comprising the serial combination of at least 40 km standard single-mode transmission fiber optimized for low dispersion operation at a wavelength in the range between 1290 nm and 1330 nm, a dispersion compensating optical waveguide fiber having a refractive index profile preselected to generate negative waveguide dispersion with a length less than about one-half that of said standard single-mode transmission fiber, such that the total dispersion per nm of source spectral width of said dispersion compensated optical transmission link is less than 300 ps/nm at a given wavelength in the wavelength range from 1520 nm to 1565 nm, and optical fiber amplifier means in said link, wherein the loss over said dispersion compensated optical transmission link is less than or equal to the loss due to attenuation over the at least 40 km length of standard single-mode fiber.

15. The optical transmission link of claim 14 wherein said amplifier means includes Er doping in the core of said dispersion compensating fiber, whereby it functions as a distributed fiber amplifier.

16. A dispersion compensated optical transmission link comprising the serial combination of at least 40 km of silica based standard single-mode transmission fiber optimized for low dispersion operation at a wavelength in the range between 1290 nm and 1330 nm, and a length of dispersion compensating optical waveguide fiber having a material dispersion and having a refractive index profile preselected to generate negative waveguide dispersion such that the total dispersion of said fiber, equal to the sum of said material dispersion and said wavequide dispersion, is less than −20 ps/nm-km at a given wavelength within the range from 1520 nm to 1565 nm, said fiber attenuatinq liqht transmitted alonq its lenqth, the attenuation of said fiber at said given wavelength is less than 1 dB/km, and the length of said dispersion compensating dispersion compensating fiber is no greater than about one-half that of said standard single-mode transmission fiber.

17. A dispersion compensated optical transmission link comprising the serial combination of at least 40 km of silica based standard single-mode transmission fiber optimized for low dispersion operation at a wavelength in the range between 1290 nm and 1330 nm, and a length of dispersion compensating optical waveguide fiber having a refractive index profile preselected to generate negative waveguide dispersion such that the total dispersion of said dispersion compensating fiber is less than $-80$ ps/nm-km at a given wavelength within the range from 1520 nm to 1565 nm, the average slope of the total dispersion versus wavelength curve in the wavelength range from 1520 nm to 1565 nm being between 0 and $-1.2$ ps/nm$^2$-km, the length of said dispersion compensating fiber being no greater than about one-half that of said standard single-mode transmission fiber.

18. A dispersion compensated optical transmission link comprising the serial combination of a first length of standard single-mode transmission fiber optimized for low dispersion operation at a wavelength in the range between 1290 nm and 1330 nm, and a dispersion compensating optical waveguide fiber having a refractive index profile preselected to generate negative waveguide dispersion and having a second length of less than about one-half said first length, such that the Composite Second Order distortion products of said transmission link at a given wavelength in the wavelength range from 1520 nm to 1565 nm are reduced to a level that is approximately the same as the Composite Second Order distortion products of a transmission link comprising a dispersion shifted single-mode fiber optimized for low dispersion operation at said given wavelength and having the same length as said first length.

19. A dispersion compensator for use with a standard single-mode transmission fiber optimized for low dispersion operation at a wavelength in the range between 1290 nm and 1330 nm, said compensator comprising an optical fiber amplifier connected in series with a dispersion compensating fiber having negative total chromatic dispersion at a given wavelength within the range from 1520 nm to 1565 nm, said optical fiber amplifier providing amplification at said given wavelength.

20. The dispersion compensator of claim 19 wherein said negative total chromatic dispersion is due to the refractive index profile of the fiber, which refractive index profile is preselected to produce negative waveguide dispersion.

21. The dispersion compensator of claim 19 wherein said dispersion compensating fiber is less than about 30 km in length.

22. The dispersion compensator of claim 19 wherein said optical fiber amplifier includes an amplifier fiber and is connected to said dispersion compensating fiber by a splice between said amplifier fiber and said dispersion compensating fiber.

23. An optical transmission system comprising an optical source operating at a given wavelength within the range from 1520 nm to 1565 nm, an optical detector, an optical transmission fiber, a dispersion compensating fiber and an optical fiber amplifier serially connected between said source and detector, said transmission fiber being optimized for low dispersion operation at a wavelength in the range from 1290 nm to 1330 nm, said dispersion compensating fiber having a refractive index profile preselected to generate negative waveguide dispersion such that the total dispersion of said fiber is less than $-20$ ps/nm-km at a given wavelength within the range from 1520 nm to 1565 nm.

24. The system of claim 23 wherein said source is connected to the serial combination of said transmission fiber, said dispersion compensating fiber and said fiber amplifier by first WDM coupler means, said system further comprising a second source operating at a wavelength between 1290 nm and 1330 nm, said second source being coupled by said first WDM coupler means to said serial combination, said detector being coupled to said serial combination by second WDM coupler means, and a second detector coupled to said serial combination by said second coupler means, said second detector being adapted to receive signals generated by said second source.

* * * * *